US012652677B2

(12) United States Patent
Lee et al.

(10) Patent No.: US 12,652,677 B2
(45) Date of Patent: Jun. 9, 2026

(54) METHOD AND APPARATUS FOR PERFORMING COMMUNICATION IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 18/291,400

(22) PCT Filed: Aug. 5, 2022

(86) PCT No.: PCT/KR2022/011614
§ 371 (c)(1),
(2) Date: Jan. 23, 2024

(87) PCT Pub. No.: WO2023/014140
PCT Pub. Date: Feb. 9, 2023

(65) Prior Publication Data
US 2024/0373440 A1     Nov. 7, 2024

(30) Foreign Application Priority Data

Aug. 6, 2021     (KR) ........................ 10-2021-0104049

(51) Int. Cl.
*H04W 72/232*     (2023.01)
*H04W 72/30*      (2023.01)
(Continued)

(52) U.S. Cl.
CPC ......... *H04W 72/232* (2023.01); *H04W 72/30* (2023.01); *H04W 76/27* (2018.02); *H04W 76/28* (2018.02)

(58) Field of Classification Search
CPC .............. H04W 72/232; H04W 72/30; H04W 76/27; H04W 76/28; H04W 4/06; H04W 72/23;
(Continued)

(56) References Cited

U.S. PATENT DOCUMENTS 11,956,697 B2 *   4/2024   Takeda ................. H04L 1/1896
12,057,892 B2 *   8/2024   Chervyakov .......... H04B 17/12
(Continued)

FOREIGN PATENT DOCUMENTS

WO     WO-2020091557 A1 *   5/2020   ............ H04W 72/23

OTHER PUBLICATIONS

PCT International Application No. PCT/KR2022/011614, International Search Report dated Nov. 16, 2022, 3 pages.
(Continued)

*Primary Examiner* — Mahendra R Patel
(74) *Attorney, Agent, or Firm* — LEE, HONG, DEGERMAN, KANG & WAIMEY

(57)     ABSTRACT

Disclosed are a method and apparatus for performing communication in a wireless communication system. A method by which a terminal performs communication, according to an embodiment of the present disclosure, comprises the steps of: receiving, from a base station, a PDCCH in at least one PDCCH MO corresponding to at least one SSB index in a specific window; and receiving, from the base station, data associated with a specific G-RNTI on the basis of the PDCCH, wherein the at least one SSB index may be an index of an SSB corresponding to the specific G-RNTI from among a plurality of SSBS configured by the base station.

7 Claims, 10 Drawing Sheets

(51) Int. Cl.
H04W 76/27 (2018.01)
H04W 76/28 (2018.01)

(58) Field of Classification Search
CPC ..... H04W 48/16; H04W 8/186; H04W 48/12;
H04W 4/08; H04W 72/12; H04L
2001/0093; H04L 1/1861; H04L 1/1887;
H04L 5/001; H04L 5/0012; H04L 5/0023;
H04L 5/0073; H04L 5/0048; H04L
5/0053; H04L 5/0082; H04L 27/2602
USPC ........................................................ 370/312
See application file for complete search history.

(56) References Cited

U.S. PATENT DOCUMENTS

| | | | | |
|---|---|---|---|---|
| 2018/0249481 | A1* | 8/2018 | Xu | H04W 72/0446 |
| 2019/0261140 | A1* | 8/2019 | Fujishiro | H04W 24/08 |
| 2020/0396744 | A1* | 12/2020 | Xiong | H04L 27/2636 |
| 2021/0045125 | A1* | 2/2021 | Mondal | H04W 80/08 |
| 2022/0110181 | A1* | 4/2022 | Miao | H04L 5/0023 |

OTHER PUBLICATIONS

Moderator (BBC), "Feature lead summary #4 on RAN basic functions for broadcast/multicast for UEs in RRC_IDLE/ RRC_INACTIVE states," R1-2106217, 3GPP TSG RAN WG1 #105-e, e-Meeting, May 2021, 126 pages.
CATT et al., "Discussion on basic functions for broadcast/multicast for RRC_IDLE/RRC_INACTIVE UEs," R1-2104493, 3GPP TSG RAN WG1 Meeting #105-e, e-Meeting, May 2021, 7 pages.
ZTE, "Discussion on basic Functions for Broadcast or Multicast for RRC_IDLE or RRC_INACTIVE UEs," R1-2104338, 3GPP TSG RAN WG1 #105-e, e-Meeting, May 2021, 17 pages.

* cited by examiner

FIG.6

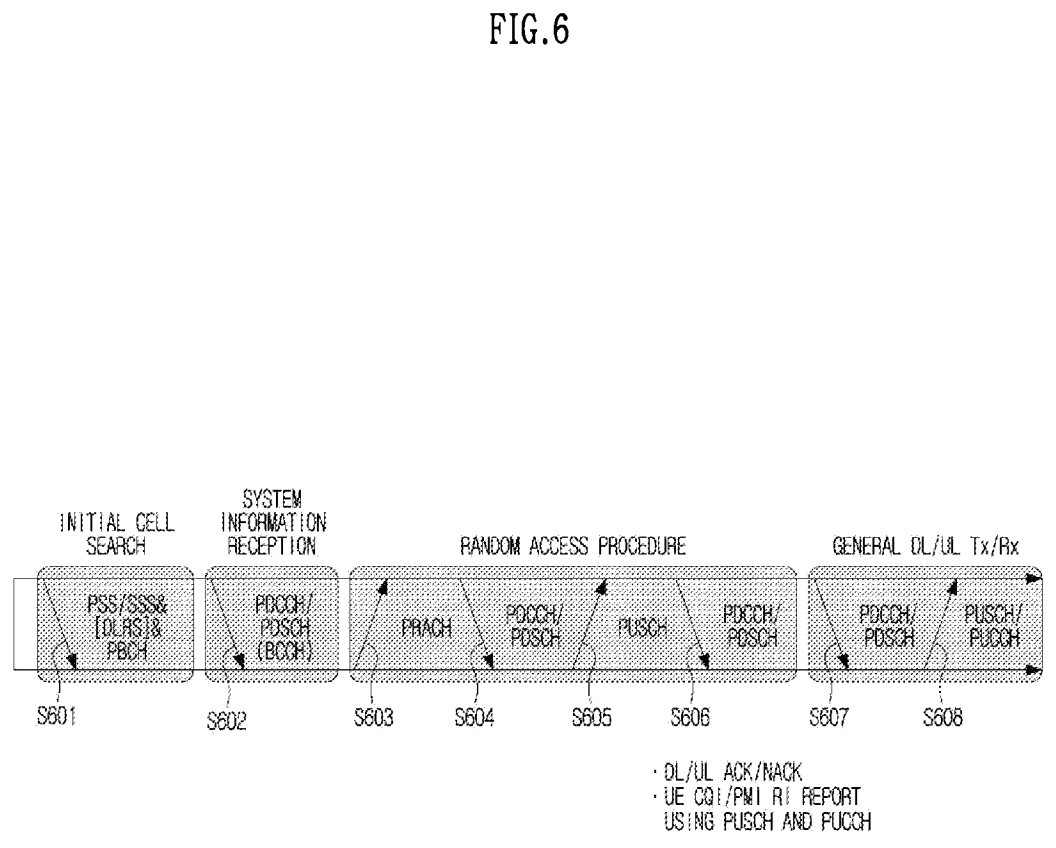

INITIAL CELL SEARCH

PSS/SSS& DL RS& PBCH
S601

SYSTEM INFORMATION RECEPTION

PDCCH/ PDSCH (BCH)
S602

RANDOM ACCESS PROCEDURE

PRACH
S603

PDCCH/ PDSCH
S604

PDCCH/ PUSCH
S605

PDCCH/ PDSCH
S606

GENERAL DL/UL Tx/Rx

PDCCH/ PDSCH
S607

PUSCH/ PUCCH
S608

- DL/UL ACK/NACK
- UE CQI/PMI/RI REPORT
  USING PUSCH AND PUCCH

FIG.7

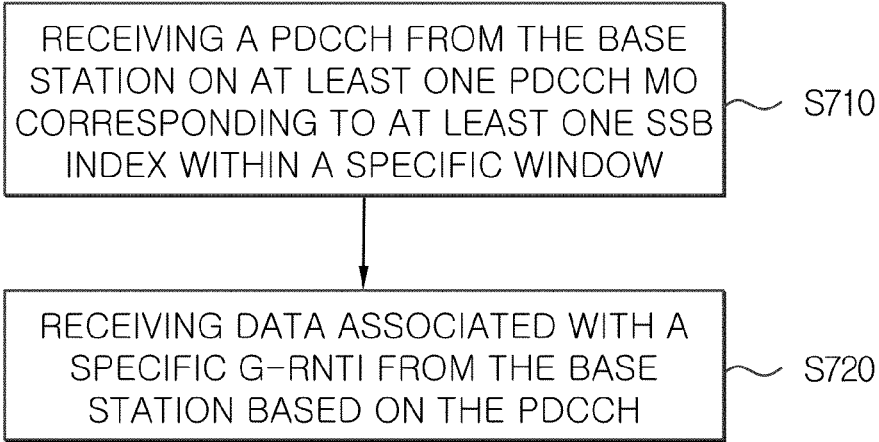

RECEIVING A PDCCH FROM THE BASE STATION ON AT LEAST ONE PDCCH MO CORRESPONDING TO AT LEAST ONE SSB INDEX WITHIN A SPECIFIC WINDOW ~ S710

RECEIVING DATA ASSOCIATED WITH A SPECIFIC G-RNTI FROM THE BASE STATION BASED ON THE PDCCH ~ S720

FIG.8

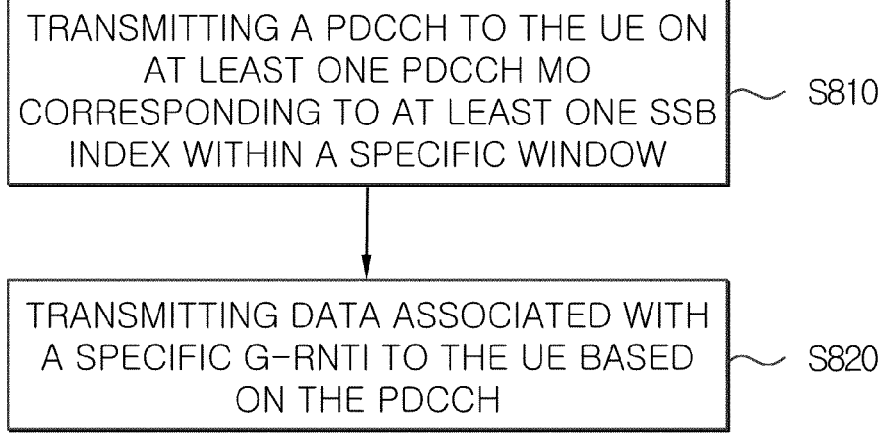

TRANSMITTING A PDCCH TO THE UE ON AT LEAST ONE PDCCH MO CORRESPONDING TO AT LEAST ONE SSB INDEX WITHIN A SPECIFIC WINDOW ~ S810

TRANSMITTING DATA ASSOCIATED WITH A SPECIFIC G-RNTI TO THE UE BASED ON THE PDCCH ~ S820

METHOD AND APPARATUS FOR PERFORMING COMMUNICATION IN WIRELESS COMMUNICATION SYSTEM

CROSS-REFERENCE TO RELATED APPLICATION(S)

This application is the National Stage filing under 35 U.S.C. 371 of International Application No. PCT/KR2022/011614, filed on Aug. 5, 2022, which claims the benefit of earlier filing date and right of priority to Korean Application No. 10-2021-0104049, filed on Aug. 6, 2021, the contents of which are all hereby incorporated by reference herein in their entireties.

TECHNICAL FIELD

The present disclosure relates to wireless communication systems, and more particularly to methods and devices for performing communication in wireless communication systems.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for performing communication in a wireless communication system.

In addition, the technical problem of the present disclosure is to provide a method and device for transmitting and receiving a group common PDCCH/PDSCH using an SSB beam or CSI-RS beam directed to a specific area so that system information can be broadcast only to a specific area.

Additionally, an additional technical problem of the present disclosure is to provide a method and device for transmitting and receiving data related to a service based on a PDCCH received at a PDCCH monitoring occasion corresponding to an SSB beam for each service.

The technical problems to be achieved by the present disclosure are not limited to the above-described technical objects, and other technical problems which are not described herein will be clearly understood by those skilled in the pertinent art from the following description.

In one embodiment of the present disclosure, a method for a user equipment (UE) to perform communication in a wireless communication system may include receiving, from a base station, a physical downlink control channel (PDCCH) on at least PDCCH monitoring occasion (MO) corresponding to at least one synchronization signal block (SSB) index within a specific window: and receiving, from the base station, data associated with a specific G(group)-RNTI (radio network temporary identifier) based on the PDCCH, and an index of the at least one SSB may be an index of a SSB corresponding to the specific G-RNTI among a plurality of SSBs configured by the base station.

In another embodiment of the present disclosure, a method for a base station to perform communication in a wireless communication system may include transmitting, to a user equipment (UE), a physical downlink control channel (PDCCH) on at least PDCCH monitoring occasion (MO) corresponding to at least one synchronization signal block (SSB) index within a specific window: and transmitting, to the UE, data associated with a specific G(group)-RNTI (radio network temporary identifier) based on the PDCCH, and an index of the at least one SSB may be an index of a SSB corresponding to the specific G-RNTI among a plurality of SSBs configured by the base station.

According to one embodiment of the present disclosure, a method and device for performing communication in a wireless communication system may be provided.

Additionally, according to an embodiment of the present disclosure, a method and apparatus for transmitting and receiving a group common PDCCH/PDSCH using an SSB beam or CSI-RS beam directed toward a specific area may be provided so that system information may be broadcast only to a specific area.

Additionally, according to an embodiment of the present disclosure, a method and device for transmitting and receiving data related to a service based on a PDCCH received at a PDCCH monitoring occasion corresponding to an SSB beam for each service may be provided.

Additionally, according to an embodiment of the present disclosure, by providing broadcasting or multicast services to limited areas, wasted resources may be reduced.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

3

FIG. 6 illustrates physical channels used in a wireless communication system to which the present disclosure may be applied and a general signal transmission and reception method using them.

FIG. 7 is a diagram for describing an uplink transmission operation of a UE in a wireless communication system to which the present disclosure may be applied.

FIG. 8 is a diagram for describing an uplink reception operation of a base station in a wireless communication system to which the present disclosure may be applied.

Figure 9:
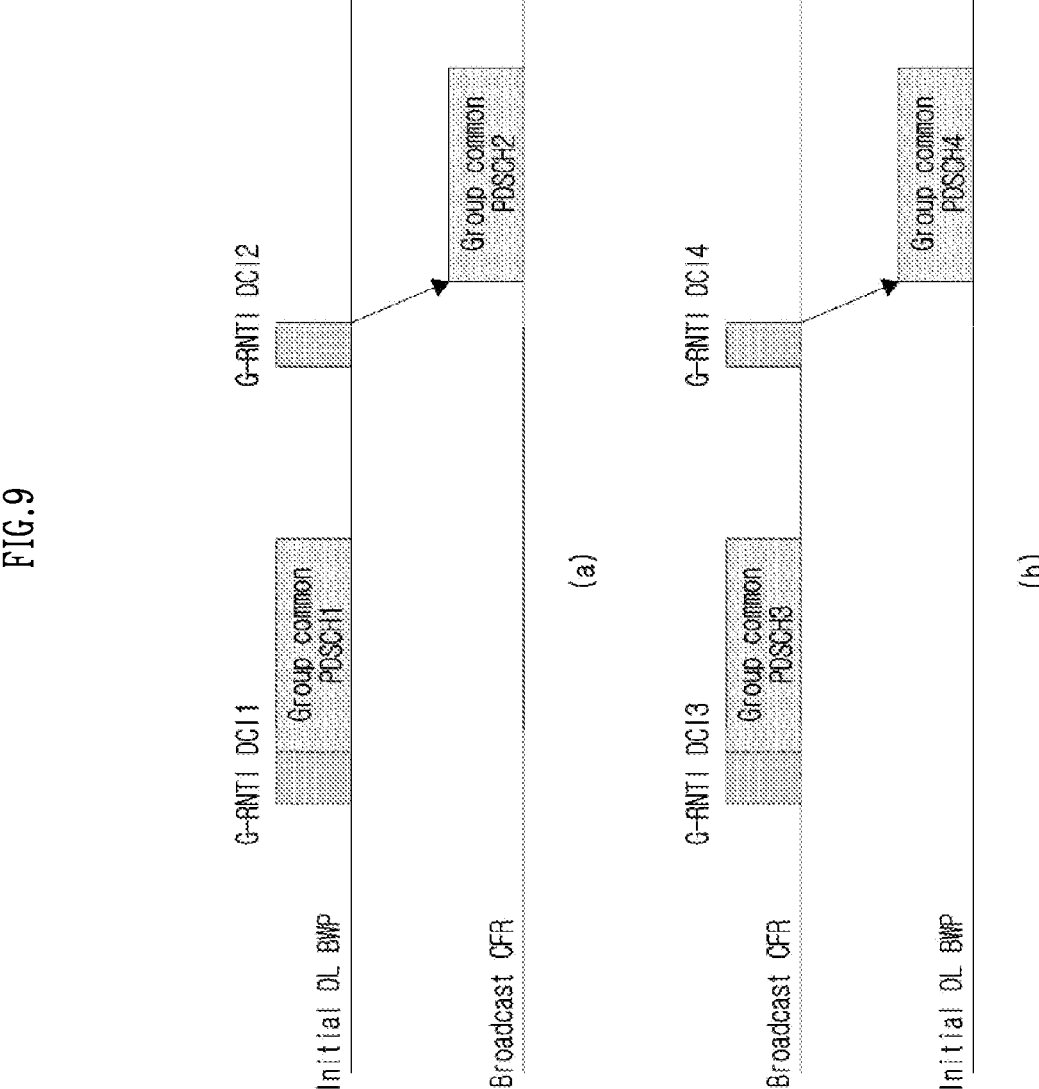

FIG. 9 is a diagram illustrating transmission and reception operations of a group common PDCCH/PDSCH for broadcast in a wireless communication system to which the present disclosure can be applied.

Figure 10:
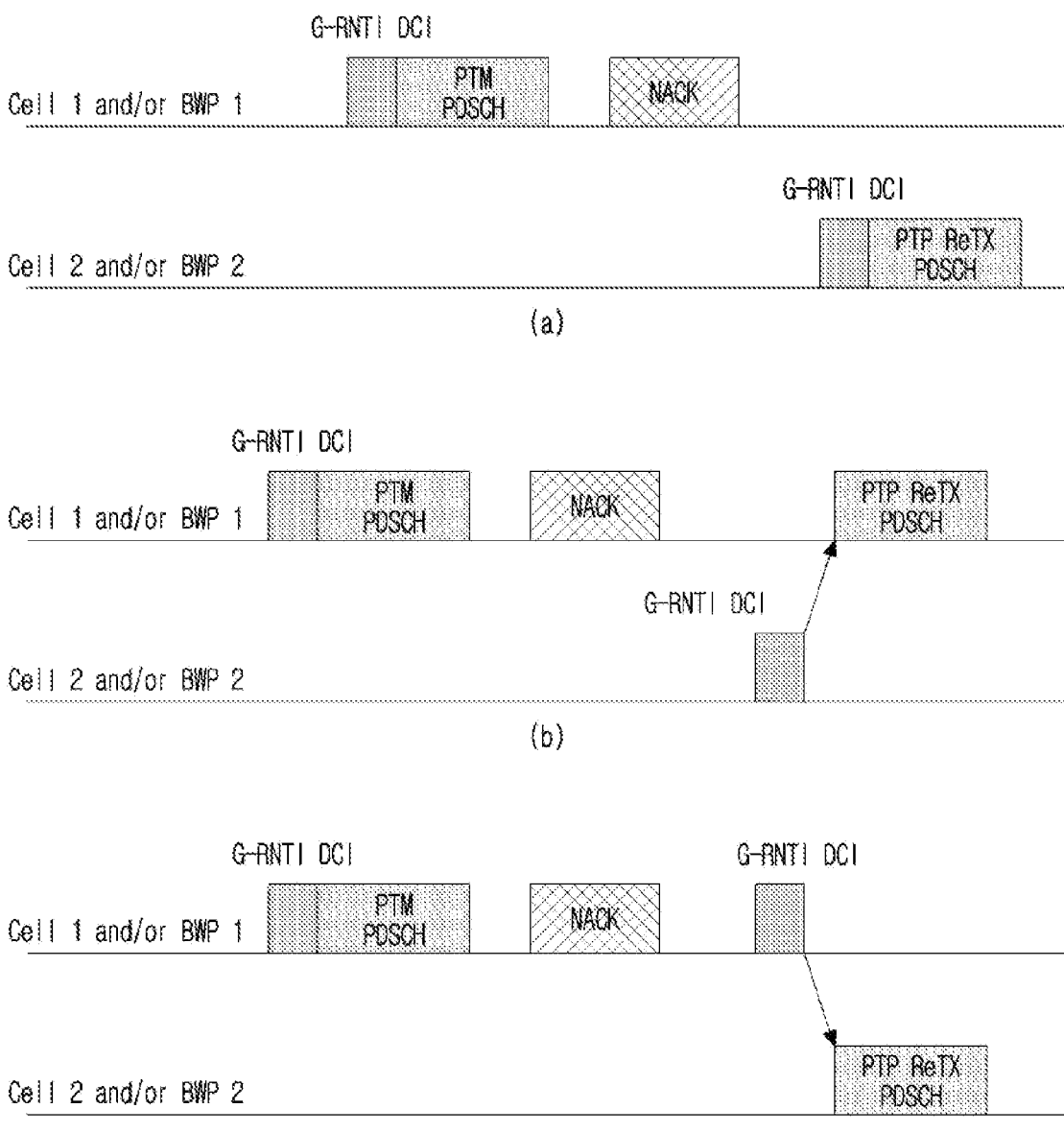

FIG. 10 is a diagram for describing the operation of a base station and a terminal according to a plurality of BWP settings to which the present disclosure can be applied.

Figure 11:
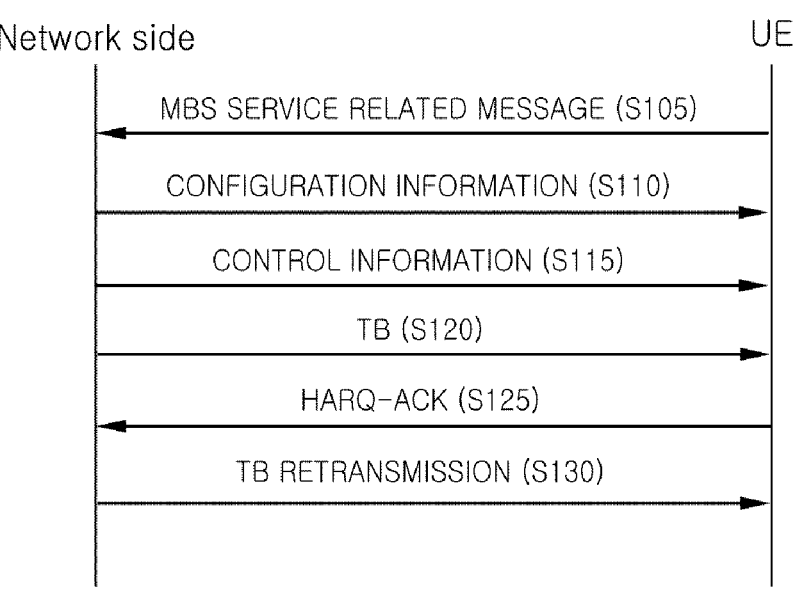

FIG. 11 is a diagram for describing the signaling procedure of the network side and the terminal according to an embodiment of the present disclosure.

Figure 12:
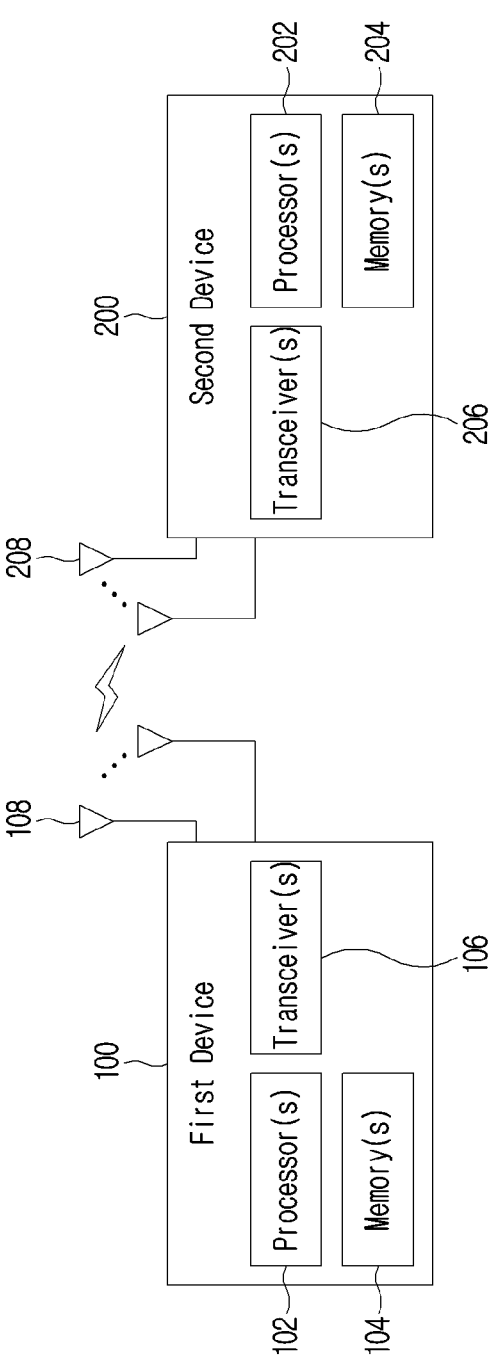

FIG. 12 illustrates a block diagram of a wireless communication device according to an embodiment of the present disclosure.

DETAILED DESCRIPTION

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi). IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

Figure 1:
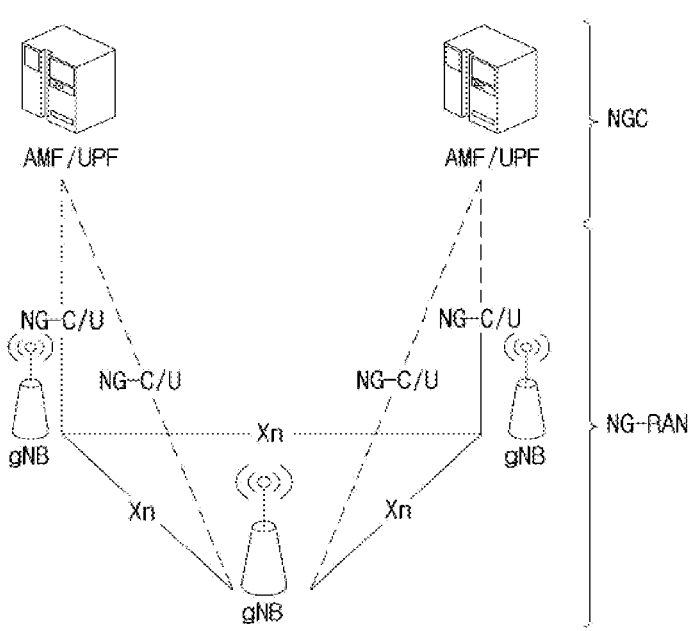
FIG. 1 illustrates a structure of a wireless communication system to which the present disclosure may be applied.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
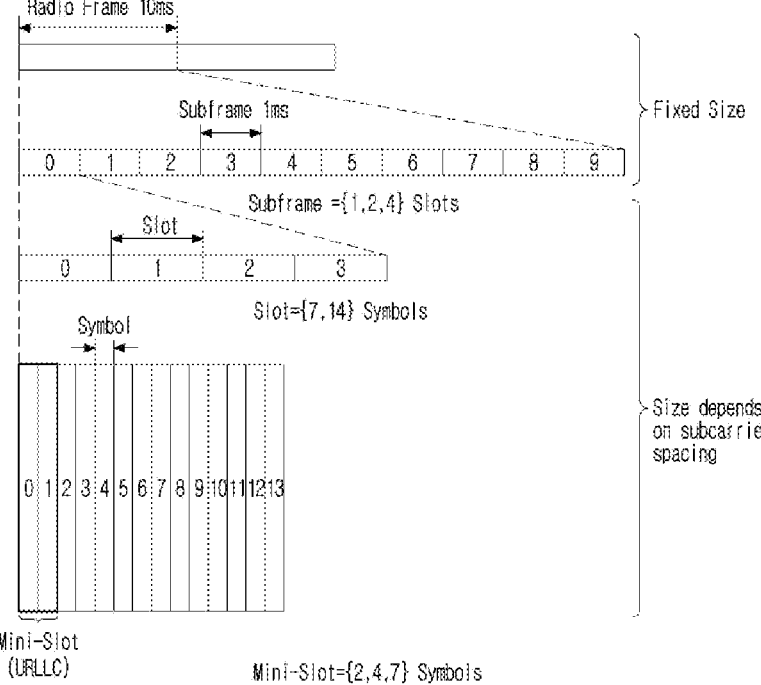
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No, i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_{s,f}^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{frame,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |

TABLE 3-continued

| μ | $N_{symb}^{slot}$ | $N_{slot}^{frame, \mu}$ | $N_{slot}^{subframe, \mu}$ |
|---|---|---|---|
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
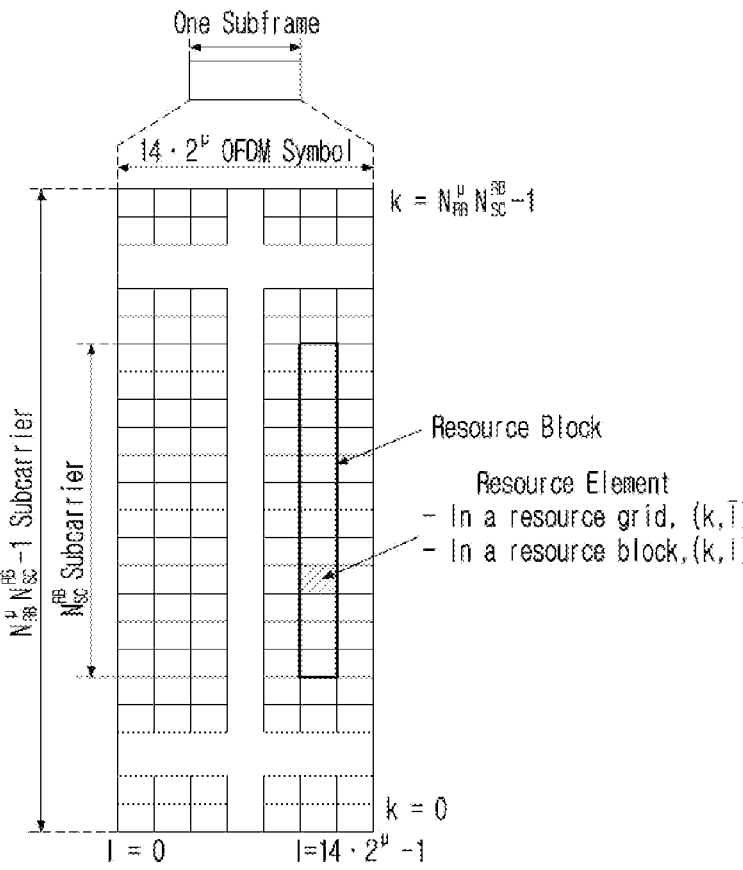
FIG. 3 illustrates a resource grid in a wireless communication system to which the present disclosure may be applied.

FIG. 3 illustrates a resource grid in a wireless communication system to which the present disclosure may be applied. In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies.

In this case, one resource grid may be configured per u and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and u may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain. Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absolute Frequency Point A represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier, centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
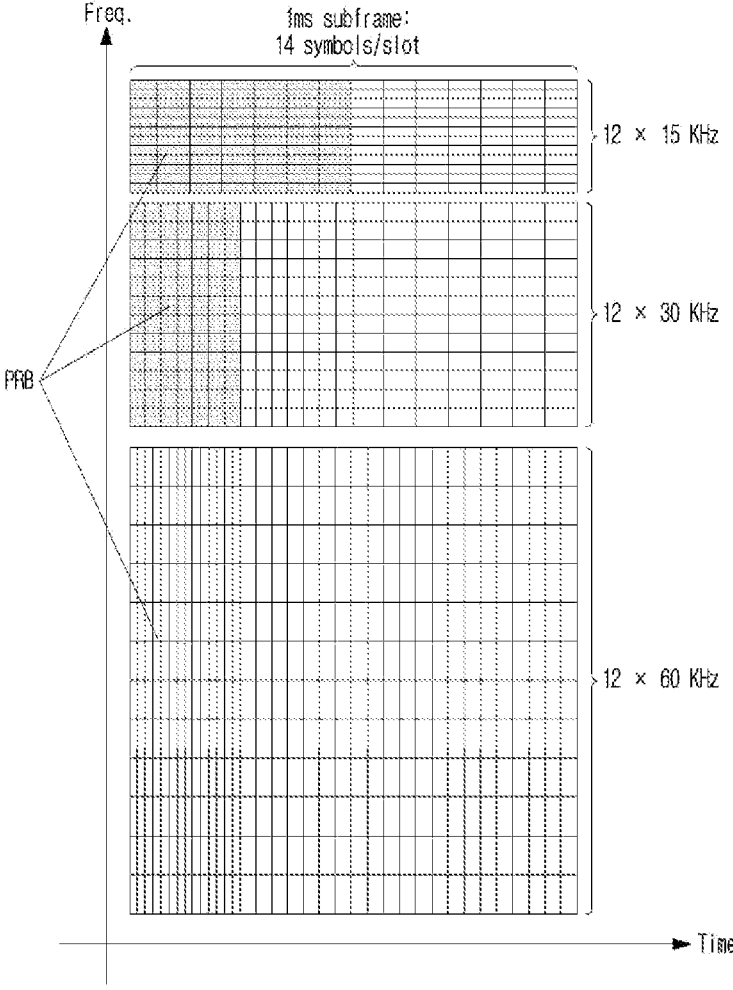
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
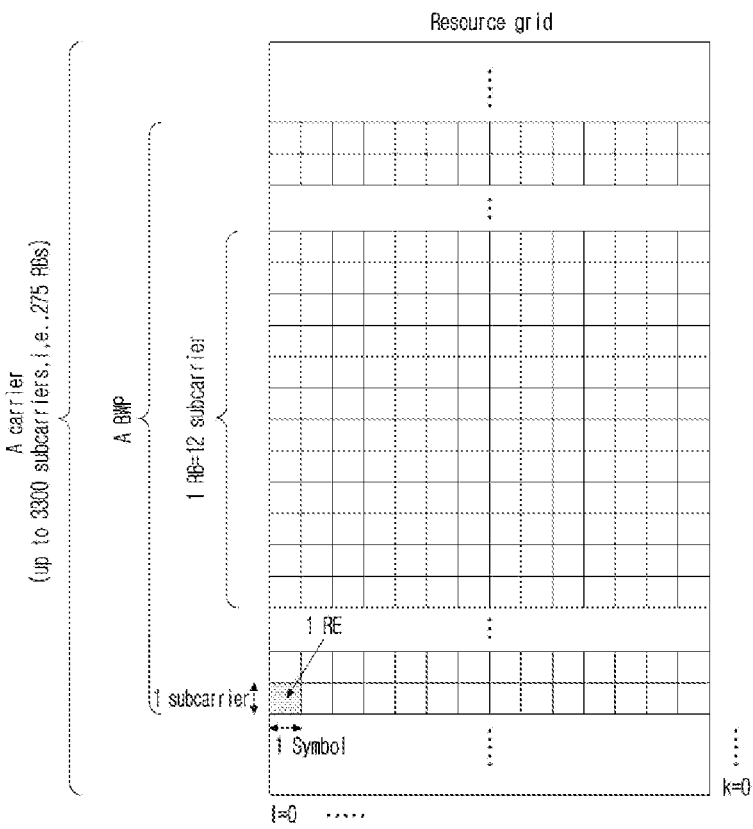
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a sub-carrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing.

Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.).

Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted. Next. DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined. DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast/Multicast Service) Scheme

MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

Here. SFN scheme may be used to provide a broadcast service to a wide area (e.g., MBMS area) through resources allocated semi-statically in advance, and SC-PTM scheme may be mainly used to provide a broadcast service only within a cell coverage through dynamic resources.

SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting SC-MCCH or SC-MTCH data may be scheduled through a PDCCH indicated by a Group Radio Network Temporary Identifier (G-RNTI).

In this case, a temporary mobile group identify (TMGI) corresponding to the service ID may be mapped one-to-one with a specific G (group)-RNTI value. Accordingly, when the base station provides a plurality of services, a plurality of G-RNTI values may be allocated for SC-PTM transmission. One or a plurality of terminals may perform PDCCH monitoring by using a specific G-RNTI to receive a specific service.

And, for a specific service/specific G-RNTI, SC-PTM dedicated DRX on-duration period may be configured, and in this case, the UEs may wake up only for a specific on-duration period and perform PDCCH monitoring for the G-RNTI.

MBS (Multicast Broadcast Service) Based Transmission/Reception Operation

In a basic wireless communication system, the base station sets UE-specific SPS (semi-persistent scheduling)

configuration information to a specific terminal, so that a downlink (DL) SPS transmission resource that is repeated according to a configured period may be allocated to a specific terminal. In this case, the DCI transmitted through the UE-dedicated PDCCH indicates activation of a specific SPS configuration index (SPS activation), thereby indicating the corresponding terminal to repeatedly receive the SPS transmission resource according to a configured period.

This initial SPS transmission resource may be used for initial HARQ transmission, and the base station may allocate a retransmission resource of a specific SPS configuration index through DCI transmitted through a UE-dedicated PDCCH. For example, when the terminal reports a HARQ negative acknowledgment (NACK) for the SPS transmission resource, the base station may allocate the retransmission resource to DCI so that the terminal may receive the DL retransmission.

And, the DCI transmitted through the UE-dedicated PDCCH may indicate deactivation (SPS release or SPS deactivation) of a specific SPS configuration index, and in this case, the corresponding UE may not receive the indicated SPS transmission resource. Here, the CRC of the DCI for the activation/retransmission/deactivation may be scrambled with a CS-RNTI (Configured Scheduling RNTI).

In a wireless communication system (e.g., NR), a DL broadcast or DL multicast transmission scheme for supporting an MBS similar to the above-described MBMS may be applied. The base station may provide a point-to-multipoint (PTM) transmission scheme and a point-to-point (PTP) transmission scheme for DL broadcast or DL multicast transmission.

In the PTM transmission scheme for MBS, the base station may transmit a group common PDCCH and a group common PDSCH to a plurality of terminals, and a plurality of UEs may simultaneously receive the same group common PDCCH and group common PDSCH transmission and decode the same MBS data.

In addition, in the PTP transmission scheme for MBS, base station may transmit the UE-dedicated PDCCH and the UE-dedicated PDSCH to a specific UE, and only the corresponding UE may receive the UE-dedicated PDCCH and the UE-dedicated PDSCH. Here, when there are a plurality of UEs receiving the same MBS service, the base station may separately transmit the same MBS data to individual UEs through different UE-dedicated PDCCHs and UE-dedicated PDSCHs.

In the PTM transmission scheme, the base station may transmit a plurality of group common PDSCHs to UEs. At this time, the base station may receive the UE's HARQ-ACK for the group common PDSCH through the UE-dedicated PUCCH resource. At this time, if the TB (Transport Block) for the group common PDSCH is successfully decoded, the UE may transmit ACK with HARQ-ACK information.

If the TB for the unicast PDSCH is not successfully decoded, the UE may transmit NACK as HARQ-ACK information. This HARQ-ACK transmission scheme may be referred to as ACK/NACK-based HARQ-ACK. The UE may transmit ACK/NACK-based HARQ-ACK using UE-dedicated PUCCH resources.

Also, assume that a NACK-based (NACK only based) HARQ-ACK scheme is configured for the group common PDSCH. The UE may not perform PUCCH transmission in a situation where ACK must be transmitted. And, the UE may perform PUCCH transmission only in situations where NACK must be transmitted. Here, the UE may transmit HARQ-ACK information including NACK through PUCCH using group common PUCCH resources.

In a basic wireless communication system, the PDCCH monitoring occasion (MO) for acquiring a system information SI message may be determined according to a parameter (e.g., 'searchSpaceOtherSystemInformation') for the ID of the search space (SS) for system information.

For example, when the value of 'searchSpaceOtherSystemInformation' is set to 0, the PDCCH MO for receiving SI messages in SI-window may be the same as the PDCCH MO for SIB1. PDCCH MO and SSB can be mapped in a predefined manner.

As another example, if 'searchSpaceOtherSystemInformation' is not set to 0), the PDCCH MO for the SI message may be determined based on the search space indicated by 'searchSpaceOtherSystemInformation'.

PDCCH MOs for SI messages that do not overlap with UL symbols (determined according to 'tdd-UL-DL-ConfigurationCommon') may be numbered sequentially from 1 in the SI-window.

The [xxN+K]th PDCCH MO(s) for the SI message of the SI-window may correspond to the Kth transmitted SSB. Here, x is set to one of 0, 1, . . . , X−1, K is set to one of 1, 2, . . . , N, and N refers to the number of actual transmitted SSBs determined according to information related to SIB1. For example, information related to SIB1 may include parameters indicating the time domain position of the transmitted SSB (e.g., 'ssb-Positions InBurst'), etc.

The actually transmitted SSBs may be numbered sequentially starting from 1 in ascending order of the SSB index. The UE may assume that the PDCCH for the SI message is transmitted in at least one PDCCH MO corresponding to each SSB transmitted in the SI window. Accordingly, the method of selecting the SSB for a received SI message may vary depending on UE implementation.

When the above-described system information transmission/broadcasting method of the base station is applied to the group common PDCCH/PDSCH of the broadcast, the base station may repeatedly transmit the group common PDCCH/PDSCH of the broadcast to all SSB beams. However, in the case of group common transmission that transmits multicast traffic, such as MTCH, there is a problem that UEs in the group may be fixedly located only in specific locations, and thus resources are wasted.

Hereinafter, so that the base station can broadcast system information, etc. only to specific areas, a scheduling method for transmitting group common PDCCH/PDSCH based on SSB beam(s) or CSI-RS beam(s) directed to a specific area will now be described.

FIG. 7 is a diagram for describing an uplink transmission operation of a UE in a wireless communication system to which the present disclosure may be applied.

The UE may receive a PDCCH from the base station on at least one physical downlink control channel (PDCCH) monitoring occasion (MO) corresponding to at least one SSB (synchronization signal block) index within a specific window (S710).

Here, the specific window may include at least one of a multicast traffic channel (MTCH) window or a multicast control channel (MCCH) window.

The PDCCH monitoring occasion may include an on-duration period or active time according to configuration information related to discontinuous reception (DRX).

The UE may not be in the RRC_connected state. That is, the terminal may be in a radio resource control (RRC)_inactive state or an RRC_idle state, but is not limited thereto.

And, the index of at least one SSB may be the index of the SSB corresponding to a specific G-RNTI among a plurality of SSBs (or a plurality of predefined SSBs) set by the base station. Therefore, the number of SSBs corresponding to a specific G-RNTI may be less than or equal to the number of the plurality of SSBs.

For example, the UE may receive parameters related to the SSB to be actually transmitted from the base station. As an example, the parameters may include, but are not limited to, parameters related to the time domain position of the SSB to be transmitted (e.g., 'ssb-PositionInBurst'). In addition, the corresponding parameter can be transmitted from the base station to the terminal through configuration information containing information related to SIB or SSB (e.g., 'ServingCellConfigCommonSIB', etc.).

Here, G-RNTI may mean a UE group identifier for receiving MBS-related data. And, TMGI corresponding to a specific service ID may be mapped to a specific G-RNTI. Therefore, the SSB beam corresponding to a specific G-RNTI may mean an SSB beam corresponding to a specific service.

For example, if at least one SSB index is k, the index of the PDCCH monitoring occasion may be [x X N+k]. Here, k is a natural number greater than or equal to 1, N is the number of actually transmitted SSBs (e.g., the number of at least one SSB), and x may be an integer greater than or equal to 0) and less than or equal to X–1. And, X may be CEIL (i.e., number/N of PDDCH monitoring within a specific window).

The UE may receive data associated with a specific G-RNTI from the base station based on the PDCCH (S720).

Here, data associated with a specific G-RNTI may include a transport block (TB) (or PDSCH including the TB) scheduled by downlink control information (DCI) CRC scrambled by the specific G-RNTI included in the PDCCH. And, the TB may include at least one of MCCH data or MTCH data associated with a specific G-RNTI.

For example, based on the transmission time of a specific TB (or a PDSCH including a specific TB) scheduled by the PDCCH received within the MTCH window being outside the MTCH window, the UE may not receive a specific TB from the base station.

As another example, based on the transmission time of a specific TB scheduled by the PDCCH received within the MTCH window being outside the MTCH window, the UE may receive a specific TB from the base station based on the transmission configuration indicator (TCI) status indicated by the DCI included in the PDCCH. That is, the UE may receive a specific TB using information related to the reference RS set by the TCI state (e.g., spatial filter information corresponding to the reference RS, etc.).

As another example, based on the transmission time of a specific TB scheduled by the PDCCH received within the MTCH window being outside the MTCH window, and the DCI included in the PDCCH not indicating the TCI state, the UE may receive a specific TB from the base station based on the SSB corresponding to the DCI (i.e., SSB beam like DCI).

FIG. 8 is a diagram for describing the communication operation of a base station in a wireless communication system to which the present disclosure may be applied.

The base station may transmit a PDCCH to the terminal in at least one PDCCH MO corresponding to at least one SSB index within a specific window (S810).

And, the base station may receive data associated with a specific G-RNTI from the base station based on the PDCCH (S820).

Operations and related parameters according to S810 and S820 may correspond to S710 and S720. The operations and related parameters according to S710 and S720 have been described with reference to FIG. 7, so redundant description will be omitted.

Hereinafter, a scheduling method for transmitting group common PDCCH/PDSCH based on SSB beam(s) or CSI-RS beam(s) directed to a specific area will be described in detail.

Embodiment 1

Embodiment 1 relates to a group common PDCCH/PDSCH transmission method for broadcasting system information.

If the location of the UEs in the group can be known in the group common transmission method, there may be no need to broadcast data (e.g., system information, etc.) for each service to all SSB beams and/or CSI-RS beams. For example, when wanting to broadcast data only to a specific area, the base station may only use SSB beam(s) or CSI-RS beam(s) directed to the specific area.

Accordingly, the base station may schedule broadcast traffic to be broadcast only on specific (or some) beams (e.g., specific SSB beams). For example, the UE may monitor the PDCCH in the PDDCH MO corresponding to specific SSB beams and receive scheduled traffic based on the PDCCH.

Specifically, in a specific window, the [xxN+K]th PDCCH MO(s) may correspond to the Kth transmitted SSB. Here, the specific window may be replaced with on-duration or active time), etc. And, x is one of 0, 1, . . . , X–1, K is one of 1, 2, . . . , N, and N may represent the number of SSBs actually transmitted according to the present disclosure. And, X may be equal to CEIL (i.e., number of PDCCH monitoring in Windows/N). The actually transmitted SSBs may be numbered sequentially starting from 1 in ascending order of the SSB index.

Embodiment 1-1

The base station may configure N actual transmitted SSBs based on specific SSBs for each G-RNTI in the [xXN+K]th PDCCH MO(s).

For example, when wanting to transmit an SSB for a specific G-RNTI, the base station may only use SSB #4, 5, 6, and 7. For example, the base station may transmit/broadcast SSB #4, 5, 6, and 7 to the terminal using an SSB bitmap, etc. At this time, N may be set to 4. The above-described configurations may be transmitted/broadcast through MBS SIB/MCCH/group common MAC CE, etc.

Here, if the measurement information of SSB #4, 5, 6, and 7 (e.g., beam quality measurement information, etc.) exceeds/is above the threshold, the UE may monitor the DCI for the corresponding G-RNTI corresponding to one or multiple SSBs among SSBs #4, 5, 6, and 7. As another example, if the measurement information of SSB #4, 5, 6, and 7 is below/below the threshold, the UE may not monitor the DCI for the corresponding G-RNTI. At this time, the threshold can be set separately by the base station through SIB or MCCH. If there is no threshold set separately by the base station, the UE may use the threshold for serving cell measurement for this purpose.

Embodiment 1-2

The base station may ensure that PDCCH transmission is performed only for specific SSB(s) in the [xXN+K]th PDCCH MO(s).

As an example, for PDDCH MO(s) corresponding to a total of N SSBs, the base station may configure group common DCI and group common PDSCH transmission to be performed only for specific SSBs (Embodiment 1-2-1).

At this time, the UE may perform PDCCH monitoring for a specific SSB based on the threshold comparison result. And, when receiving the group common DCI for a specific SSB, the UE may receive the group common PDSCH scheduled by the DCI.

As an another example, for PDCCH MO(s) corresponding to a total of N SSBs, the base station may transmit group common DCI for all SSBs, but group common PDSCH may be transmitted only for specific SSBs (Embodiment 1-2-2).

Here, the DCI for the SSB in which the group common PDSCH is not transmitted may indicate that the PDSCH is not transmitted for the SSB. Additionally or alternatively, the DCI for an SSB for which a group common PDSCH is not transmitted may indicate that a group common PDSCH is transmitted for another SSB. At this time, DCI may indicate the TCI status corresponding to another SSB.

The UE may perform PDCCH monitoring for a specific SSB according to the threshold comparison result. When receiving a group common DCI for a specific SSB, when group common PDSCH transmission scheduled by the DCI is connected to the specific SSB, the UE may receive the corresponding PDSCH. However, if the group common PDSCH transmission scheduled by DCI is not connected to a specific SSB, the UE may receive the PDSCH only when the measurement value of the SSB connected to the group common PDSCH is greater than or equal to the threshold.

Embodiment 1-3

The base station may schedule a TB in which MCCH data and MTCH data are multiplexed through the group common DCI (Example 1-3-1). That is, one PDSCH containing (or transmitting) the corresponding TB may be scheduled by a specific group common DCI. Here, a specific group common DCI may be transmitted within the MCCH window or MTCH window. And, the specific group common DCI may be CRC scrambled with an RNTI for MCCH, a G-RNTI for MTCH, or a new separate RNTI.

As another example, each of the PDSCH for different MCCHs and the PDSCH for MTCH may be scheduled with one group common DCI (Embodiment 1-3-2). The one group common DCI may be transmitted within an MCCH window or an MTCH window, and may be CRC scrambled into an RNTI for MCCH, a G-RNTI for MTCH, or a new separate RNTI.

Embodiment 1-4

Embodiment 1-4 relate to an MTCH window that can be defined separately from the MCCH window.

For example, a specific MTCH window may be mapped to one or multiple G-RNTIs (Embodiment 1-4-1). The base station may configure one MTCH window to be mapped to one or multiple G-RNTIs through RRC or MAC CE. A UE that wishes to receive data related to the G-RNTI may monitor the PDCCH through the MTCH window mapped to the corresponding G-RNTI.

The base station may configure the MTCH window and multiple G-RNTIs to be mapped according to a specific method (or formula). At this time, a UE that wishes to receive data related to a specific G-RNTI can monitor the PDCCH by determining an MTCH window mapped to the specific G-RNTI according to the specific method (or formula).

As another example, information mapped to a specific G-RNTI may not exist in a specific MTCH window configured by the base station (Embodiment 1-4-2).

As an example, the UE may attempt to receive all G-RNTIs it wants to receive during the PDCCH MO of the MTCH window (Embodiment 1-4-2-1).

As another example, the UE may attempt to receive a specific G-RNTI according to the DRX for each G-RNTI during the PDCCH MO within the MTCH window (Embodiment 1-4-2-2). For this purpose, the base station may transmit separate DRX configuration information for G-RNTI, G-RNTI group-specific, broadcast, or common PDCCH for all groups to the terminal. Accordingly, the UE may determine the on-duration period for the G-RNTI according to the DRX configurations of the specific G-RNTI it wishes to receive, and monitor the DCI for the corresponding G-RNTI during the determined on-duration. At this time, the on-duration period can be defined only within the MTCH window.

As another example, the UE may attempt to receive a specific G-RNTI according to the search space for each G-RNTI during the PDCCH MO of the MTCH window (Embodiment 1-4-2-3). For this purpose, the base station may transmit separate search space setting information for G-RNTI, G-RNTI group-specific, broadcast, or common PDCCH for all groups to the UE. Accordingly, the UE may monitor DCI in the G-RNTI according to the search space configurations of the specific G-RNTI it wishes to receive. At this time, the search space for G-RNTI may be defined only within the MTCH window.

As another example, a group common PDSCH within or outside the MTCH window may be scheduled by the group common DCI received within the MTCH window (Embodiment 1-4-3).

As an example, DCI may schedule PDSCH only in slots within the MTCH window (Embodiment 1-4-3-1).

For example, if k0 of the group common DCI (e.g., the time offset value between the time (or slot) at which DCI is received and the time (or slot) at which PDSCH is received, etc.) received within the MTCH window is outside the MTCH window, the UE may ignore the DCI and not receive the PDSCH scheduled by the DCI.

If the DCI indicates repetition (of PDSCH transmission), some PDSCH transmissions may fall outside the MTCH window. During repeated slot-based PDSCH transmission, if some PDSCH transmissions exceed the MTCH window of some slots, the UE may not receive PDSCH transmissions that exceed the MTCH window depending on the configurations of the base station.

As another example, DCI may schedule the PDSCH in a slot outside the MTCH window (Embodiment 1-4-3-2).

For example, even if k0 of the group common DCI received within the MTCH window is outside the MTCH window, the UE may receive the PDSCH scheduled by the DCI beyond the MTCH window.

If the DCI indicates repetition (of PDSCH transmissions), some PDSCH transmissions may fall outside the MTCH window. During repeated slot-based PDSCH transmission, if some PDSCH transmissions exceed the MTCH window of some slots, the UE may receive PDSCH transmissions that exceed the MTCH window according to the configurations of the base station.

And, SSB mapping may occur only within the MTCH window. Assume that a PDSCH outside the MTCH window is scheduled by k0 of the group common DCI. If the DCI indicates the TCI state, the UE may receive the PDSCH using the indicated TCI state. As another example, when the DCI does not indicate the TCI status, the UE may receive the PDSCH using the same SSB beam as the DCI.

Embodiment 1-5

Embodiment 1-5 relates to the operation of the base station and UE when the MTCH window is not defined.

The UE may perform PDCCH monitoring on the MTCH in the search space for the remaining time interval, excluding all time intervals in which SSB/SI/paging information may be transmitted (Embodiment 1-5-1). At this time, the base station may configure a separate PDCCH monitoring duration according to a method described later.

For example, to configure the PDCCH monitoring duration, the base station may configure DRX for MTCH by G-RNTI (group), broadcast only, priority, and BWP/CFR (Embodiment 1-5-1-1).

For example, a plurality of [xXN+K]th PDCCH MO(s) within the on-duration determined according to the DRX configuration may be configured to be mapped to each of the N SSBs (Embodiment 1-5-1-1-1). For example, mapping between SSB and PDCCH MO may be configured according to Embodiments 1-1 and 1-2. Here, N may be a value configured per G-RNTI (group), broadcast only, priority, or BWP/CFR. The UE may monitor the PDCCH in the PDCCH MO for a specific SSB within the on-duration. A specific SSB may be determined as the best SSB determined according to the SSB measurement information of the serving cell or an SSB whose measurement information is greater than or equal to a threshold.

As another example, for CORESET within the on-duration determined according to DRX configurations, the UE may monitor the CORESET of a specific SSB based on CORESET to SSB mapping information. A specific SSB may be determined as the best SSB determined according to the SSB measurement information of the serving cell or an SSB whose measurement information is greater than or equal to a threshold.

As an another example, the MTCH window is configured without DRX configurations, and when new HARQ transmission for group common transmission is detected within the MTCH window, the UE may extend the MTCH window for a certain period of time according to the base station configurations (Embodiment 1-5-1-2). A plurality of [xXN+K]th PDCCH MO(s) of the extended time period may be mapped to SSB according to Embodiments 1-1 and 1-2. And, the length of the extended time period may be configured by the base station.

As another example, when a separate PDCCH monitoring section is not set, the UE may monitor the PDCCH according to the search space for MBS (Embodiment 1-5-2). At this time, the base station may configured the search space by G-RNTI group, broadcast only, priority, or BWP/CFR.

Embodiment 1-6

Considering collisions or simultaneous reception capabilities of terminals, etc., the base station may be configured so that MCCH or MTCH transmission does not occur in at least one of the SSB transmission available duration, MIB/SIB1 transmission available duration, or other SI transmission available duration (SI-window) (Embodiment 1-6-1).

As another example, since the UE does not always receive MIB/SIB1/SI, the UE may be configured/defined to receive MCCH/MTCH even if a collision occurs (Embodiment 1-6-2).

As another example, conflicts may be resolved after configuring each window (Embodiment 1-6-3). The base station may schedule PDCCH and PDSCH according to priority, which will be described later. Alternatively, the UE may monitor the PDCCH or receive the PDSCH by selecting one window according to the priority that will be described later.

As an example of a priority method, when the SI-window and the MCCH/MTCH window overlap, the base station and the terminal may give priority to the SI window. As another example, for the remaining SIBs excluding specific SIBs (e.g., SIB 2/3/4), the MCCH window may be prioritized or the MTCH window with high priority may be set/defined to be prioritized.

As another example of the priority method, when a connected UE receives multicast and broadcast at the same time, the base station and the UE may configure/define that one of the multicast or broadcast has a higher priority.

As another example of the priority method, the base station and the UE may be configured to receive the PDSCH according to the priority index in the section where the windows overlap. For example, the base station and the UE may be configured to preferentially transmit and receive the PDSCH for high priority (HP).

As another example, information related to the MCCH/MTCH window may be determined/configured/defined to avoid collisions (Embodiment 1-6-3).

The base station may prevent collisions between SI windows and MCCH/MTCH windows or between MCCH/MTCH windows by setting the slot offset or SFN offset of the MCCH/MTCH window. At this time, the slot offset or SFN offset of the MCCH/MTCH window may be explicitly configured to RRC, but is not limited to this and may be defined by specific rules.

As another example, the MCCH window offset is predefined, and the base station may configure only the MTCH window offset separately. As another example, the base station may configure different MTCH window offsets for each G-RNTI depending on the G-RNTI value. As another example, the base station may configure different MTCH window offsets for each priority in order to distinguish between HP PDSCH transmission and LP PDSCH transmission.

Embodiment 1-7

Embodiment 1-7 relates to a method in which the repetition number is adjusted for each service.

As an example, the base station may determine/configure the number of repetitions for each G-RNTI (group), broadcast only, priority, or BWP/CFR through a SIB or MCCH message (Embodiment 1-7-1).

When repetitive operation is applied to Embodiment 1-1 and Embodiment 1-2, the [xXN+K]th PDCCH MO(s) according to Examples 1-1 and 1-2 may be modified to the [xXNxR+K]th PDCCH MO(s). Accordingly, the [xXNxR+K]th PDCCH MO(s) may be mapped to the kth SSB. At this time, R may correspond to the number of repetitions or the aggregation factor value.

As another example, when the group common DCI indicates the number of repetitions, the UE may receive a PDSCH equal to the number of repetitions based on the TCI status for DCI transmission or the TCI state indicated by the DCI.

Embodiment 1-8

Embodiment 1-8 relate to a method in which the group common DCI indicates broadcast or multicast when the group common DCI schedules the group common PDSCH.

As an example, Broadcast PDSCH scheduling may be indicated by configuring to a specific value based on HARQ-related information (e.g., HARQ feedback enabling/disabling information, PRI (PUCCH resource indicator) of group common DCI, etc.). Additionally or alternatively, a new 1-bit indicator in the group common DCI may indicate broadcast PDSCH or multicast PDSCH scheduling.

Additionally or alternatively, If the received DCI indicates multicast, a UE in an idle state or a UE in an inactive state may not receive the PDSCH scheduled by the corresponding DCI even if the CRC of the corresponding DCI is scrambled to the G-RNTI desired to be received.

Additionally or alternatively, when the received DCI indicates broadcast, the connected UE may not receive the PDSCH scheduled by the DCI even if the CRC of the DCI is scrambled to the G-RNTI desired to be received.

Additionally or alternatively, if the received DCI indicates broadcast, the UE may receive the PDSCH scheduled by the corresponding DCI according to the broadcast configurations. For example, when the received DCI indicates broadcast, the UE may receive the PDSCH from the broadcast CFR.

Additionally or alternatively, if the received DCI indicates multicast, the UE may receive the PDSCH scheduled by the corresponding DCI according to the multicast configurations. For example, if the received DCI indicates multicast, the UE may receive the PDSCH from the CFR for multicast.

Embodiment 2

Embodiment 2 relates to the BWP/CFP scheduling method of broadcast.

As shown in FIG. 9 (a) and FIG. 9(b), the UE may receive group common PDCCH/PDSCHs scheduled for different G-RNTIs through FDM or TDM. As shown in FIG. 9 (a) and FIG. 9(b), in the present disclosure, the group common DCI of the initial BWP may schedule the group common PDSCH in the same initial BWP, or may schedule the group common PDSCH of the broadcast CFR. Additionally or alternatively, the group common DCI of the broadcast CFR may schedule the group common PDSCH of the same or different CFR, or the group common PDSCH in the initial BWP.

At this time, the base station may configure the broadcast CFR to be located within the initial DL BWP. Alternatively, the base station may configure the broadcast CFR to a wider area including the initial DL BWP. Alternatively, the base station may configure the broadcast CFR to be located outside the initial DL BWP. Alternatively, the numerology of the broadcast CFR and the initial DL BWP may be configured to be the same or different.

Hereinafter, when the initial DL BWP and broadcast CFR are operated similarly to CA (carrier aggregation), self-carrier scheduling or cross-carrier scheduling will be described.

Here, in (a) of FIG. 9, the scheduling BWP may be the first DL BWP through which DCI is transmitted, and the scheduled BWP may be the first DL BWP or CFR through which PDSCH is transmitted. In (b) of FIG. 9, the scheduling BWP may be a CFR through which DCI is transmitted, and the scheduled BWP may be the first DL BWP or CFR through which PDSCH is transmitted.

For example, in the CA's scheduled BWP, CFR may not be set and broadcast PDCCH/PDSCH transmission may be configured to not be supported (Embodiment 2-1).

At this time, SS (search space)/CORESET for broadcast cannot be configured in the scheduled BWP. The UE may ignore the SS/CORESET configurations for broadcast of the scheduled BWP or consider/deem them as invalid configurations. Alternatively, the UE may determine that the SS/CORESET configuration for the scheduled BWP is not for broadcast.

In addition, CFR may be configured only in the CA's scheduling BWP, or broadcast PDCCH/PDSCH transmission may be supported.

As another example. CFR may be configured in the CA's scheduled BWP, and group common transmission may be supported (Embodiment 2-2).

As an example. PDCCH configuration information (e.g., 'PDCCH-config') and PDSCH configuration information (e.g., 'PDSCH-config') used for broadcast transmission may be configured for the CFR of the scheduled BWP. At this time, SS/CORESET for broadcast may be configured in the scheduled BWP (Embodiment 2-2-1).

According to Embodiment 2-2-1, intra-carrier scheduling of unicast transmission may not be supported in the CA's scheduled BWP. However, if 'PDCCH-config' for broadcast and 'PDSCH-config' for broadcast for the scheduled BWP are configured, the UE may expect intra-carrier scheduling to be possible except for group common transmission.

As another example, 'PDSCH-config' used for broadcast transmission may be configured for the CFR of the scheduled BWP, but 'PDSCH-config' used for broadcast transmission cannot be configured (Embodiment 2-2-2).

At this time, as shown in (b) of FIG. 10, the PDSCH of the CA scheduled BWP may be cross-carrier scheduled with the DCI of the G-RNTI transmitted in the CA scheduled BWP. At this time, the DCI of G-RNTI may include the BWP index. The base station may set the BWP index of the group common DCI so that all UEs in the group can interpret it as the same BWP through an RRC message dedicated to individual UEs.

For example, if CFR is configured for the CA scheduling BWP and 'PDSCH-config' is not configured for the CFR of the CA scheduling BWP, only cross-carrier scheduling for PDSCH may be possible. Accordingly, the UE may expect that the PDSCH of the CA scheduled BWP is cross-carrier scheduled by the DCI of the G-RNTI transmitted in the CA scheduled BWP.

At this time, the group common DCI of G-RNTI may not need to include a BWP index indicating the CA scheduled BWP. Additionally, the UE may determine that the PDSCH of a specific CA scheduled BWP is cross-carrier scheduled by the DCI of the G-RNTI transmitted from the specific CA scheduled BWP according to the RRC message configurations of the base station.

As another example, when a CFR is configured in the CA scheduling BWP and 'PDSCH-config' is set for the CFR in the CA scheduling BWP, cross-carrier scheduling or intra-carrier scheduling may be indicated with the BWP index of the group common DCI. Accordingly, the UE may receive the group common PDSCH from the CA scheduled BWP or CA scheduled BWP according to the BWP index of the group common DCI.

Embodiment 2-3

If 'PDCCH-config' for broadcast and 'PDSCH-config' for broadcast are configured for the CA's scheduled BWP, the UE may not expect PTP retransmission in any cell from the base station. As another example, the UE may not expect PTP retransmission only from the CA's scheduled BWP, but may expect PTP retransmission only from the CA's scheduled BWP.

As an example, when a NACK is received from a specific UE for a TB transmitted on PTM PDSCH in BWP 1, the base station may schedule the PDSCH for PTP retransmission in BWP 2 through the DCI of BWP 2 (Embodiment 2-3-1).

At this time, BWP 1 may be the CA's scheduled BWP, and BWP 2 may be the CA's scheduling BWP. As an example, as shown in (a) of FIG. 10, NACK may be transmitted through a UE common PUCCH from BWP 1, and may be transmitted through a UE dedicated PUCCH from BWP 2.

When a NACK is received from a specific UE for the TB transmitted on PTM PDSCH in BWP 1, the base station may indicate PTM transmission of BWP 1 through the DCI of BWP 2 and schedule PDSCH for PTP retransmission of BWP 2 (Embodiment 2-3-2). At this time. BWP 1 may be the CA's scheduled BWP, and BWP 2 may be the CA's scheduling BWP.

For example, the DCI of BWP 2 may include a BWP index for BWP 1 and an indicator indicating that it is a PTP retransmission. Depending on the configuration of the base station, the UE may soft combine the TB received from PTM in BWP 1 and the TB received from PDSCH following PTP retransmission in BWP 2 into a soft buffer of the same HARQ process according to the BWP index for BWP 1 indicated by the DCI of BWP 2.

At this time, as shown in (b) of FIG. 10, NACK may be received from BWP 1 through the UE common PUCCH, and may be received from BWP2 through the UE dedicated PUCCH.

As another example, when a NACK is received from a specific UE for a TB transmitted on PTM PDSCH in BWP 1, the base station may schedule the PDSCH for PTP retransmission of BWP 1 through the DCI of BWP 2 (Example 2-3-3). At this time. BWP 1 is the CA's scheduled BWP, and BWP 2 is the CA's scheduling BWP.

For example, as shown in (b) of FIG. 10, the DCI of BWP 2 may include a BWP index for BWP 1 and an indicator indicating PTP retransmission. Depending on the configurations of the base station, the UE may receive a PDSCH according to PTP retransmission from BWP 1 according to the BWP index for BWP 1 indicated by the DCI of BWP 2. The UE may soft merge the TB received through PTM method in BWP 1 and the TB received from PDSCH according to PTP retransmission in BWP 1 into the soft buffer of the same HARQ process.

As another example, the base station may semi-statically match PTM transmission in BWP 1 and PTP retransmission in BWP 2 through an RRC message or MAC CE (Embodiment 2-3-4).

At this time, the DCI for PTP retransmission may not need to indicate the PTM transmission BWP. If the DCI's HPN is the same, the UE may treat the PTM transmission in BWP 1 and the PTP retransmission in BWP 2 as having transmitted the same TB by the RRC message or MAC CE received from the base station, and soft combine them with the soft buffer of the same HARQ process.

As another example. CA's scheduled BWP may support both self-carrier scheduling and cross-carrier scheduling for PTP retransmission (Embodiment 2-3-5).

That is, for PTP retransmission, the base station may transmit the PTP PDCCH in the CA's scheduled BWP or the CA's scheduled BWP, and transmit the PTP PDSCH in the CA's scheduled BWP. For example, the base station may be configured to support all of embodiments 2-3-1 to 2-3-3. At this time. DCI for PTP retransmission may be transmitted to the primary cell (PCell) or secondary cell (SCell).

In the above embodiment, when BWP 2 is the scheduled BWP of the CA, the DCI of the C-RNTI scheduling PTP retransmission may be transmitted through a common search space (CSS). Additionally or alternatively, when USS is configured in BWP 2, PTP retransmission may be scheduled through USS (UE-specific search space).

Additionally or alternatively, if BWP 2 is the CA's scheduling BWP, the DCI of the C-RNTI scheduling PTP retransmissions may schedule PTP retransmissions via CSS or USS.

Embodiment 2-4

If 'PDCCH-config' for broadcast and 'PDSCH-config' for broadcast are configured for the CA's scheduled BWP, in CA's scheduled BWP, the UE may expect PTP retransmission for the first PTM transmission.

As an example, assume that PTP retransmission is self-carrier scheduled in the CA's scheduled BWP (Embodiment 2-4-1).

For example, when a NACK for a TB transmitted from BWP 1 to the PTM PDSCH is received from a specific UE, the base station may schedule the PDSCH for PTP retransmission in BWP 1 through the DCI of BWP 1. At this time, BWP 1 may be a CA scheduled BWP. And, for BWP 1, which is the CA's scheduled BWP, the DCI of the C-RNTI scheduling PTP retransmission can be transmitted through CSS. Additionally or alternatively, if USS is configured for BWP 1, PTP retransmission may be scheduled over USS.

As another example, assume that PTP retransmission is cross-carrier scheduled in the CA's scheduled BWP (Embodiment 2-4-2).

As an example, as shown in (c) of FIG. 10, when a NACK for the TB transmitted on the PTM PDSCH in BWP 1 is received from a specific UE, the base station may schedule the PTP retransmission PDSCH of BWP 2 through the DCI of BWP 1. At this time, BWP 1 is the CA's scheduled BWP, and BWP 2 may be the CA's scheduled BWP or the CA scheduling BWP.

That is, the PDCCH according to PTP retransmission may be transmitted in the CA scheduled BWP, and the PDSCH according to the PDCCH may be transmitted in another serving BWP. At this time, for BWP 1, which is the CA's scheduled BWP, the DCI of the C-RNTI scheduling PTP retransmission may be transmitted through CSS. Additionally or alternatively, if USS is configured in BWP 1, PTP retransmission may be scheduled via USS.

Additionally, the UE may soft combine the TB received through PTM from BWP 1 and the TB received from PDSCH following PTP retransmission of BWP 2 into the soft buffer of the same HARQ process.

As another example, when a NACK for TB transmitted from BWP 2 to PTM PDSCH is received from a specific UE, the base station may schedule the PDSCH according to the PTP retransmission of BWP 2 through the DCI of BWP 2 (Embodiment 2-4-3).

At this time, BWP 1 and BWP 2 may both be CA's scheduled BWPs. And, as shown in (a) of FIG. 10, NACK may be transmitted and received from BWP 1 through a UE common PUCCH, or from BWP 2 through a UE dedicated PUCCH.

As another example, when a NACK for TB transmitted from BWP 1 to PTM PDSCH is received from a specific UE, the base station may indicate PTM transmission in BWP1 through the DCI of BWP 2 and schedule PDSCH according to PTP retransmission of BWP 2. At this time, both BWP 1 and BWP 2 may be CA scheduled BWPs.

For example, the DCI of BWP 2 may include a BWP index for BWP 1 and an indicator indicating that it is a PTP retransmission. Depending on the base station configurations, the UE may soft combine TB received by the PTM of BWP 1 according to the BWP index for BWP 1 indicated by the DCI of BWP 2 and TB received from PDSCH according to PTP retransmission of BWP 2 into the soft buffer of the same HARQ process.

At this time, as shown in (a) of FIG. 10, NACK may be transmitted and received from BWP 1 through the terminal common PUCCH, or from BWP 2 through the UE-specific PUCCH.

As another example, the base station may semi-statically match PTM transmission in BWP 1 and PTP retransmission in BWP 2 through an RRC message or MAC CE (Embodiment 2-4-5).

At this time, the DCI for PTP retransmission does not need to indicate the BWP for PTM transmission. If the DCI's HPN is the same, the UE may treat the PTM transmission in BWP 1 and the PTP retransmission in BWP 2 as having transmitted the same TB through the RRC message or MAC CE received from the base station, and soft combine them into the soft buffer of the same HARQ process.

As another example, CA's scheduled BWP supports both self-carrier scheduling and cross-carrier scheduling for PTP retransmission (Embodiment 2-4-6). That is, for PTP retransmission, the base station may transmit the PTP PDCCH in the CA's scheduled BWP or the CA's scheduling BWP, and transmit the PTP PDSCH (scheduled by the corresponding PDCCH) in the CA's scheduled BWP. For example, the base station may be configured to support all of embodiments 2-4-1 to 2-4-4. At this time, DCI for PTP retransmission may be transmitted to PCell or SCell.

In the above-described embodiment, BWP 1 may be replaced with Cell 1, and BWP 2 may be replaced with Cell 2.

Embodiment 3

MCCH Change Notification may be used to indicate that MCCH information will change in the next MCCH cycle. When receiving an MCCH change notification message from the base station, the UE may attempt to receive MCCH information in the next cycle. As another example, if the MCCH change notification message is not received, the UE may not receive MCCH information in the next cycle.

As an example, MCCH change notification may be indicated through a reserved bit of the paging DCI. As another example, an MCCH change notification may be indicated through a specific bit in a short message of the paging DCI.

As another example, a wake-up indication such as paging early indication (PEI) may indicate MCCH change notification. As another example, when PEI is transmitted through DCI, a specific bit of DCI may indicate MCCH change notification. As another example, when the PEI is transmitted in a sequence, a specific sequence may indicate an MCCH change notification.

As another example, a DCI that is CRC scrambled with a specific RNTI rather than a paging-RNTI may indicate an MCCH change. At this time, DCI may be defined as compact DCI. And, the specific RNTI may be determined as an RNTI for MCCH or a separate dedicated RNTI.

And, the UE may monitor MCCH change notification at the next time.

As an example, the UE may monitor the PDCCH indicating MCCH change notification within the terminal's own paging occasion (PO). As another example, the UE may monitor the PDCCH indicating MCCH change notification within a time interval in which PEI can be received. As another example, the UE may monitor the PDCCH indicating MCCH change notification at an offset before or after the start of the next MCCH period.

FIG. 11 is a diagram for describing the signaling procedure of the network side and the UE according to an embodiment of the present disclosure.

FIG. 11 shows an example of signaling between a network side and a terminal (UE) in a situation where the embodiments (e.g., Embodiment 1, Embodiment 2, Embodiment 3, or a combination of one or more of the detailed Embodiments thereof) of the present disclosure described above may be applied.

Here, the UE/network side is exemplary and may be applied to various devices as described with reference to FIG. 12. FIG. 11 is for convenience of description, and does not limit the scope of the present disclosure. In addition, some step(s) shown in FIG. 11 may be omitted depending on circumstances and/or settings. In addition, in the operation of the network side/UE of FIG. 11, the above-described uplink transmission/reception operation etc. may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUs.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may enter RRC_CONNECTED mode and report a message indicating one or more interested MBS services to the network (S105).

Here, the UE may transmit the message to the network through at least one of a UCI, MAC CE (Control Element), and RRC message. And, the MBS service of interest in the message may mean one of TMGI or G-RNTI listed in the DL message received from the network side.

For example, the DL message may be a service availability message listing TMGI #1, TMGI #3, TMGI #5, and TMGI #10. If the UE is interested in TMGI #5, the UE may indicate the order of TMGI #5 in the message. That is, the UE may report '3' to the network.

As another example, the DL message may be a service availability message listing G-RNTI #1, G-RNTI #3, G-RNTI #5, and G-RNTI #10. If the UE is interested in G-RNTI #10, the UE may indicate the order of G-RNTI #10 in the message. That is, the UE may report '4' to the network.

For example, the operation of the UE (100 or 200 in FIG. 12) in step S105 described above to transmit the message to the network side (200 or 100 in FIG. 12) may be implemented by the device in FIG. 12, which will be described below. For example, referring to FIG. 12, one or more processors 102 may control one or more transceivers 106 and/or one or more memories 104 to transmit the message, and one or more transceivers 106 may transmit the message to the network.

and group common PDSCH transmission resources for MBS transmission and reception. One UL CFR may provide HARQ-ACK PUCCH resources for group common PDSCH reception. One CFR may be one MBS-specific BWP or one UE-specific BWP. Additionally or alternatively, one or multiple CFRs may be set within one UE-specific BWP. One CFR may have a connection relationship with one terminal-specific BWP.

The UE may be configured with at least a G-RNTI value for each MBS CFR or each serving cell. GC-CS-RNTI may be configured/used to activate (or enable), retransmit or release one or more group common SPS configurations.

If it is not configured with CFR for the UE or GC-CS-RNTI for the serving cell, and CS-RNTI is configured for the CFR or serving cell, the UE may use the CS-RNTI to activate, retransmit, or release one or more group common SPS configurations.

The network side may associate a TMGI list or a G-RNTI list with one GC-CS-RNTI value. At this time, the network side may provide a TMGI list or a G-RNTI list associated with the GC-CS-RNTI value.

Additionally, the configuration information (e.g., 'PDSCH-config') of each PDSCH may be configured as shown in Table 8 with the minimum information elements for multicast and/or broadcast.

TABLE 8

```
PDSCH-Config ::= SEQUENCE {
dataScramblingIdentityPDSCH INTEGER (0..1023) OPTIONAL, -- Need S
dmrs-DownlinkForPDSCH-MappingTypeA SetupRelease { DMRS-DownlinkConfig }
OPTIONAL, -- Need M
dmrs-DownlinkForPDSCH-MappingTypeB SetupRelease { DMRS-DownlinkConfig }
OPTIONAL, -- Need M
tci-StatesToAddModList SEQUENCE (SIZE(1..maxNrofTCI-States)) OF TCI-State
OPTIONAL, -- Need N
tci-StatesToReleaseList SEQUENCE (SIZE(1..maxNrofTCI-States)) OF TCI-StateId
OPTIONAL, -- Need N
vrb-ToPRB-Interleaver ENUMERATED {n2, n4} OPTIONAL, -- Need S
resourceAllocation ENUMERATED { resourceAllocationType0, resourceAllocationType1,
dynamicSwitch},
pdsch-TimeDomainAllocationList SetupRelease { PDSCH-
TimeDomainResourceAllocationList } OPTIONAL, -- Need M
pdsch-AggregationFactor ENUMERATED { n2, n4, n8 } OPTIONAL, -- Need S
rateMatchPatternToAddModList SEQUENCE (SIZE (1..maxNrofRateMatchPatterns)) OF
RateMatchPattern OPTIONAL, -- Need N
rateMatchPatternToReleaseList SEQUENCE (SIZE (1..maxNrofRateMatchPatterns)) OF
RateMatchPatternId OPTIONAL, -- Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, -- Need S
maxNrofCodeWordsScheduledByDCI ENUMERATED {n1, n2}
... }
```

Upon receiving the message, the network side may transmit configuration information to the UE via an RRC message (S110).

For example, the configuration information may include search space configuration information including CFR (common frequency resource) configuration information, one or more group common PDSCH configurations information including TCI state for one or more G-RNTI values, and TCI status for one or more G-RNTI values.

Here, the RRC message may be a group common message transmitted through a PTM Multicast Control Channel (MCCH) or a UE-specific message transmitted through a UE-specific Dedicated Control Channel (DCCH).

And, CFR may include DL CFR and UL CFR. For example, one DL CFR may provide group common PDCCH For example, the operation of the UE (100 or 200 in FIG. 12) in step S110 described above receiving the configuration information from the network side (200 or 100 in FIG. 12) may be implemented by the device in FIG. 11, which will be described below. For example, referring to FIG. 11, one or more processors 102 may control one or more transceivers 106 and/or one or more memories 104 to receive the configuration information, and one or more transceivers 106 may receive the configuration information from a network side. The UE may receive control information from the network (S115). For example, the UE may receive downlink control information (DCI) for scheduling/activating/deactivating uplink/downlink from the network side.

Specifically, if a search space is configured for the configured CFR, the UE may receive CRC scrambled DCI with G-RNTI or G (group)-CS (configured scheduling)-RNTI by monitoring the PDCCH in the SS (search space) set in the configured CFR.

For example, the operation of the UE (100 or 200 in FIG. 12) in step S115 described above receiving the control information from the network side (200 or 100 in FIG. 12) may be implemented by the device in FIG. 12, which will be described below. For example, referring to FIG. 12, one or more processors 102 may control one or more transceivers 106 and/or one or more memories 104 to receive the control information, and one or more transceivers 106 may receive the control information from a network side.

The UE may receive TB from the network side (S120).

Specifically, if a data unit is available on the MTCH of the MBS radio bearer (MRB) for the MBS service, the network side may include a data unit for the SPS PDSCH occasion associated with the MTCH of the MRB for the MBS service, or associated with the TMGI of the MBS service, or associated with the short ID of the MBS service, or may construct the TB associated with the G-RNTI mapped to the MBS service according to the service-to-resource mapping and transmit it to the UE.

For group common dynamic scheduling of TB, the network side may transmit DCI to the UE through PDCCH. The DCI may be CRC scrambled by G-RNTI, G-CS-RNTI, or CS-RNTI. PDCCH may be implemented as a group common PDCCH or a UE-specific PDCCH.

For example, the DCI may include at least one of identifier for DCI format, carrier indicator, bandwidth part indicator. Frequency domain resource assignment, time domain resource allocation, VRB-to-PRB mapping, PRB bundling size indicator, rate matching indicator, ZP CSI-RS trigger, MCS, NDI, RV, HARQ process number, downlink allocation index, TPC command for scheduled PUCCH, PUCCH resource indicator, PDSCH-to-HARQ_feedback timing indicator, antenna port, transmission setup indication, SRS request. DMRS sequence initialization, priority indicator.

For group common dynamic scheduling, by group common or UE specific RRC message or by group common or UE specific MAC CE, the network side may provide the UE with one or more service-resource mappings for MBS services identified by TMGI or G-RNTI or GC-CS-RNTI. Data of the MBS service may be carried through the MBS radio bearer (MRB) of the multicast traffic logical channel, that is, the MTCH associated with the MBS service. The RRC message may be a group common message transmitted through a PTM Multicast Control Channel (MCCH) or a UE-specific message transmitted through a UE-specific Dedicated Control Channel (DCCH). The DCI scheduling PDSCH carrying MBS service data may also indicate one or more of a short ID, MTCH ID, MRB ID, G-RNTI value, and TMGI value for the MBS service.

When the UE receives the CRC scrambled DCI by the G-RNTI it wants to receive, the UE may determine the MBS service(s) associated with one or more of the short ID, MTCH ID, MRB ID, G-RNTI value, and TMGI value for each PDSCH occasion, based on the mapping between the MBS service indicated in the DCI and the HPN and/or the mapping between the MBS service indicated in the DCI and the short ID(s).

Then, if the UE is interested in the determined MBS service(s), the UE may receive the PDSCH transmission scheduled by the DCI. If the UE is not interested in the determined MBS service(s), the UE may not receive the PDSCH transmission scheduled by DCI.

For example, the operation of the UE (100 or 200 in FIG. 12) in step S120 described above to receive the TB from the network side (200 or 100 in FIG. 12) can be implemented by the device in FIG. 12, which will be described below. For example, referring to FIG. 12, one or more processors 102 may control one or more transceivers 106 and/or one or more memories 104 to receive the TB, and one or more transceivers 106 may receive the TB from a network side.

Upon receiving the group common DCI indicating the PUCCH resource for MBS HARQ-ACK, the UE may transmit HARQ-ACK through the PUCCH after receiving the PDSCH scheduled by the DCI (S125). That is, depending on the decoding state of PDSCH transmission, the UE may transmit HARQ feedback to the network.

For PTM scheme 1, the group common DCI may indicate a single PUCCH resource indicator and a single PDSCH-to-HARQ_feedback timing indicator at least for ACK/NACK-based HARQ-ACK.

Specifically, in the case of UE-specific PUCCH resource allocation for ACK/NACK-based HARQ-ACK for group common DCI, Other UEs in the group may be configured to a different value of at least 'PUCCH-Resource' and 'dl-DataToUL-ACK' in the UE-specific 'PUCCH-config' for multicast or unicast (unless 'PUCCH-config' for multicast is configured). Different PUCCH resources may be allocated to different UEs by the same PUCCH resource indicator and the same PDSCH-to-HARQ_feedback timing indicator of the group common DCI.

For PTP retransmission, in a UE-specific DCI, the PUCCH resource indicator and PDSCH-to-HARQ_feedback timing indicator may be interpreted based on 'PUCCH-config' for unicast regardless of whether 'PUCCH-config' for multicast is configured.

Here, PRI (PUCCH Resource Indicator) may be indicated by the group common DCI, as will be described later.

As an example, a UE-specific PRI list may be included in the DCI (Option 1A-1). Each PRI in that list may indicate an entry corresponding to the candidate 'pucch-ResourceId' value of 'PUCCH-config' for allocation of the same PUCCH resource or different PUCCH resources for different UEs in the group that received the same DCI. Different PRIs in the DCI can point to different entries in 'PUCCH-config'.

Here, the candidate 'pucch-ResourceId' value may be configured by RRC, and a different 'pucch-ResourceId' value may be configured for other UEs of the same group at least in multicast 'PUCCH-config'.

As another example, a group common PRI may be included in the DCI (Option 1A-2). A single group common PRI may indicate a specific entry for a candidate 'pucch-ResourceId' value in the UE-specific 'PUCCH-config' for allocation of the same or different PUCCH resources for all UEs in the group.

And, the candidate 'pucch-ResourceId' value may be configured by RRC. At least in 'PUCCH-config' for multicast, different 'pucch-ResourceId' values may be configured for different UEs in the same group.

If 'PUCCH-config' for multicast is configured with HARQ-ACK to group common PDSCHs scheduled by group common DCI, the UE may assume that the PRI of the group common DCI indicates an entry corresponding to the candidate 'pucch-ResourceId' value of 'PUCCH-config' for multicast.

If 'PUCCH-config' for multicast is configured with HARQ-ACK to group common PDSCHs scheduled by group common DCI, the UE may assume that the PRI of the group common DCI indicates an entry corresponding to the candidate 'pucch-ResourceId' value of 'PUCCH-config' for multicast.

K1 (PDSCH-to-HARQ_feedback timing indicator) may be indicated by the group common DCI, as will be described later.

As an example, a list of UE-specific K1 values may be included in the DCI (Option 1B-1). Each K1 in the list may indicate the same UL slot or a different UL (sub) slot for other terminals in the group.

For example, different K1 values are assigned to different UEs. That is, a K1 value may be assigned to UE 1, a K2 value may be assigned to UE 2, and a K3 value may be assigned to UE 3.

As another example, the K1 value may be shared by multiple UEs. For example, UE 1 and UE 2 may share the K1 value, and UE 3 and UE 4 may share the K2 value.

As another example, one K1 value may be a reference, and another K1 value may be assigned based on that reference. {List of K1_ref, K1_offset} may be indicated in DCI.

For example, UE 1 may use K1_ref, UE 2 may use K1_ref+K1_offset1, and UE 3 may use K1_ref+K1_offest2.

As another example, a group common K1 value may be included in the DCI (Option 1B-2). For example, a single K1 value may be the same for all UEs in a group receiving DCI, or may indicate a corresponding entry for the candidate 'dl-DataToUL-ACK' value in the UE-specific 'PUCCH-config' for different PUCCH resource allocation. This can be applied when the DCI format is configured in the UE-specific 'PUCCH-config' for the K1 value.

As another example, the candidate 'dl-DataToUL-ACK' value is configured by RRC and may be configured differently for other UEs of the same group at least in 'PUCCH-config' for multicast.

As another example, if 'PUCCH-config' for multicast is configured for HARQ-ACK for grouping common PDSCH scheduled by group common DCI, the UE may assume that the K1 value of the group common DCI indicates the corresponding entry for the candidate 'dl-DataToUL-ACK' value in 'PUCCH-config' for multicast.

As another example, if 'PUCCH-config' for multicast is not configured for HARQ-ACK to group common PDSCH scheduled by group common DCI, the UE may assume that the K1 value of the group common DCI indicates an entry corresponding to the candidate 'dl-DataToUL-ACK' value in 'PUCCH-config' for unicast.

In addition, upon receiving the group common DCI CRC scrambled by the G-RNTI and/or the terminal-specific DCI CRC scrambled by the C-RNTI, if Type-1 HARQ-ACK codebook is configured for 'PUCCH-config' for multicast and/or 'PUCCH-config' for unicast, the UE may configure TDRA (Time Domain Resource Allocation) to generate a type-1 HARQ-ACK codebook for HARQ-ACK(s) to group common PDSCH scheduled by group common DCI and/or UE-specific PDSCH scheduled by UE-specific DCI.

If TB decoding is not successful in the PDSCH transmission occasion, the UE may transmit HARQ NACK to the base station through PUCCH resources in the configured UL CFR.

By using PUCCH resources, the UE may transmit HARQ-ACK to other PDSCH transmissions, such as unicast SPS PDSCH, dynamic unicast PDSCH, PTP retransmission, and/or dynamic group common PDSCH.

Here, to multiplex HARQ-ACK on PUCCH in (sub)slots for SPS PDSCH for multicast, SPS PDSCH for unicast, dynamically scheduled multicast PDSCH and/or dynamically scheduled unicast PDSCH, the UE may construct a codebook based on one or more of the above-described options.

If the RSRP threshold is configured, the UE may use NACK-only based HARQ-ACK based NACK based on the RSRP of the measured serving cell. If the measured RSRP is higher than the threshold, NACK-only-based HARQ-ACK may be transmitted through the group common PUCCH resource indicated by the DCI's PRI. If the measured RSRP is lower than the threshold, NACK-only-based HARQ-ACK can be changed to ACK/NACK-based HARQ-ACK on the UE-specific PUCCH resource indicated by the PRI of the DCI.

Meanwhile, when 'pdsch-AggregationFactor' is configured for G-RNTI or 'repeat_number' is indicated by DCI from the network side, TB scheduled by group common DCI, if configured, may be repeated for the Nth HARQ transmission of the TB within each symbol allocation between each 'pdsch-AggregationFactor' consecutive slot or between each 'repeat_number' consecutive slot.

For example, the operation of the UE (100 or 200 in FIG. 12) in step S125 described above to transmit the HARQ-ACK from the network side (200 or 100 in FIG. 12) may be implemented by the device in FIG. 12, which will be described below. For example, referring to FIG. 12, one or more processors 102 may control one or more transceivers 106 and/or one or more memories 104 to transmit the HARQ-ACK, and one or more transceivers 106 may transmit the HARQ-ACK from a network side.

The network side that has received the HARQ NACK in the TCI state may retransmit the PDCCH and PDSCH using the TCI state in the DL CFR configured for retransmission of the TB (S130).

The UE may monitor the group common and/or UE-specific PDCCH using the TCI state for the search space configured in the DL CFR to receive retransmission of the TB. The network side may retransmit the TB to one of the UEs in the group by UE-specific PDCCH. However, since the other UE successfully received the TB, it may not receive the TB retransmission.

When the UE receives the PDCCH for retransmission of the TB, the UE may receive the PDSCH scheduled by the DCI of the PDCCH. If the UE successfully decodes TB from PDSCH, the UE may consider the decoded TB to be associated with short ID for MTCH, MRB, TMGI, G-RNTI and/or MBS services based on the mapping between the MBS service indicated by the DCI and the HPN (HARQ process number), and/or the mapping between the MBS service indicated by the DCI and the short ID(s).

If TB decoding is successful at the PDSCH transmission occasion, the UE may transmit HARQ ACK to the network through PUCCH resources in the UL CFR configured according to the above-described procedure. Using the PUCCH resource, the UE may transmit HARQ-ACK to other PDSCH transmissions, such as unicast SPS PDSCH, dynamic unicast PDSCH, PTP retransmission, and/or dynamic group common PDSCH.

In this case, to multiplex HARQ-ACK on PUCCH in (sub) slots for SPS PDSCH for multicast, SPS PDSCH for unicast, dynamically scheduled multicast PDSCH and/or dynamically scheduled unicast PDSCH, the UE may construct a codebook based on one or more of the options/embodiments described above.

For example, the operation of the UE (100 or 200 in FIG. 12) in step S130 described above receiving a TB retransmission from the network side (200 or 100 in FIG. 12) may be implemented by the device in FIG. 12, which will be described below. For example, referring to FIG. 12, one or more processors 102 may control one or more transceivers 106 and/or one or more memories 104, etc. to receive the TB retransmission, and one or more transceivers 106 may receive the TB retransmission from a network side.

General Device to which the Present Disclosure May be Applied

FIG. 12 illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure.

For example, the processor 102 may process the information in the memory 104 to generate first information/signal and then transmit a wireless signal including the first information/signal through the transceiver 106. Additionally, the processor 102 may receive a wireless signal including the second information/signal through the transceiver 106 and then store information obtained from signal processing of the second information/signal in the memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:

receiving, by a user equipment (UE) from a base station, a physical downlink control channel (PDCCH) on at least a PDCCH monitoring occasion (MO) corresponding to at least one synchronization signal block (SSB) index within a specific window; and receiving, by the UE from the base station, data associated with a specific group-radio network temporary identifier (G-RNTI) based on the PDCCH, wherein the at least one SSB index is an index of a SSB corresponding to the specific G-RNTI among a plurality of SSBs configured by the base station, wherein the specific window includes at least one of a multicast traffic channel (MTCH) window or a multicast control channel (MCCH) window, and wherein, based on transmission time of a specific transport block (TB) scheduled by the PDCCH received within the MTCH window being outside the MTCH window, the specific TB is received from the base station based on a transmission configuration indicator (TCI) state indicated by downlink control information (DCI) included in the PDCCH.

2. The method of claim 1, wherein:

data associated with the specific G-RNTI includes a TB scheduled by the DCI CRC scrambled by the specific G-RNTI included in the PDCCH.

3. The method of claim 2, wherein:

the TB includes at least one of MCCH data or MTCH data associated with the specific G-RNTI.

4. The method of claim 1, wherein:

the PDCCH monitoring occasion includes an on-duration period or active time according to discontinuous reception (DRX) related configuration information.

5. The method of claim 1, wherein:

the UE is in radio resource control (RRC) inactive state or RRC_idle state.

6. A user equipment (UE) comprising:

at least one transceiver; and at least one processor coupled to the at least one transceiver;

wherein the at least one processor is configured to:

receive, from a base station through the at least one transceiver, a physical downlink control channel (PDCCH) on at least a PDCCH monitoring occasion (MO) corresponding to at least one synchronization signal block (SSB) index within a specific window; and receive, from the base station through the at least one transceiver, data associated with a specific group-radio network temporary identifier (G-RNTI) based on the PDCCH, wherein the at least one SSB index is an index of a SSB corresponding to the specific G-RNTI among a plurality of SSBs configured by the base station, wherein the specific window includes at least one of a multicast traffic channel (MTCH) window or a multicast control channel (MCCH) window, and wherein, based on transmission time of a specific transport block (TB) scheduled by the PDCCH received within the MTCH window being outside the MTCH window, the specific TB is received from the base station based on a transmission configuration indicator (TCI) state indicated by downlink control information (DCI) included in the PDCCH.

7. A base station comprising:

at least one transceiver; and at least one processor coupled to the at least one transceiver;

wherein the at least one processor is configured to:

transmit, to a user equipment (UE) through the at least one transceiver, a physical downlink control channel (PDCCH) on at least a PDCCH monitoring occasion (MO) corresponding to at least one synchronization signal block (SSB) index within a specific window; and transmit, to the UE through the at least one transceiver, data associated with a specific group-radio network temporary identifier (G-RNTI) based on the PDCCH, wherein the at least one SSB index is an index of a SSB corresponding to the specific G-RNTI among a plurality of SSBs configured by the base station, wherein the specific window includes at least one of a multicast traffic channel (MTCH) window or a multicast control channel (MCCH) window, and wherein, based on transmission time of a specific transport block (TB) scheduled by the PDCCH transmitted within the MTCH window being outside the MTCH window, the specific TB is transmitted to the UE based on a transmission configuration indicator (TCI) state indicated by downlink control information (DCI) included in the PDCCH.

* * * * *